H. E. DURST.
GATE SPRING.
APPLICATION FILED SEPT. 10, 1917.
1,249,928.
Patented Dec. 11, 1917.
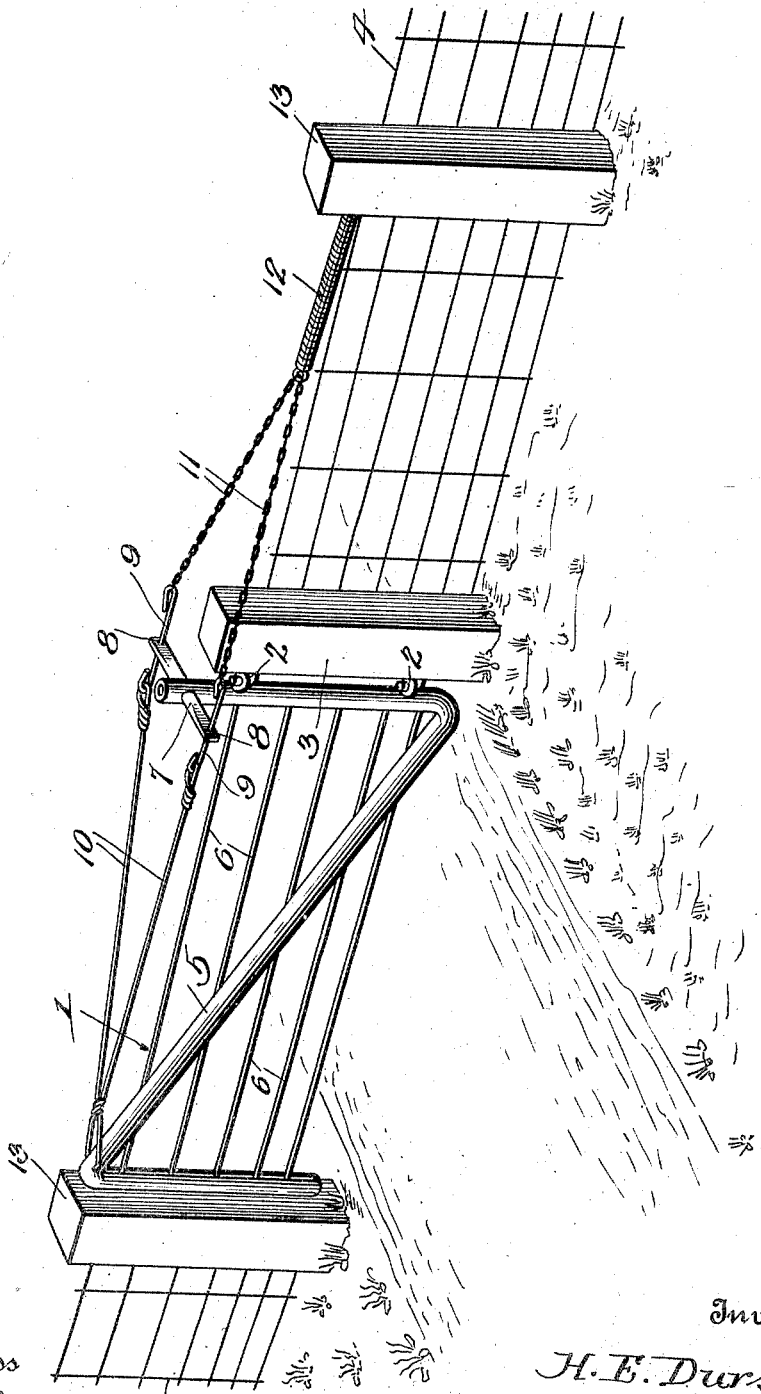

UNITED STATES PATENT OFFICE.

HARRY E. DURST, OF MOORHEAD, MONTANA, ASSIGNOR OF ONE-HALF TO WILLIAM LEITNER, OF MOORHEAD, MONTANA.

GATE-SPRING.

1,249,928.  Specification of Letters Patent.  Patented Dec. 11, 1917.

Application filed September 10, 1917. Serial No. 190,570.

*To all whom it may concern:*

Be it known that I, HARRY E. DURST, a citizen of the United States, residing at Moorhead, in the county of Custer and State of Montana, have invented certain new and useful Improvements in Gate-Springs; and I do declare the following to be a full, clear, and exact description of the invention, such as will enable others skilled in the art to which it appartains to make and use the same.

My invention has for its object to provide an extremely simple and inexpensive, yet a highly efficient and durable self-closing gate, and with this general object in view, the invention resides in certain novel features of construction and unique combinations of parts to be hereinafter fully described and claimed, the descriptive matter to be supplemented by the accompanying drawing which forms a part of this specification and in which a perspective view of the invention is illustrated.

In the drawing above briefly described, the numeral 1 designates a gate which is hinged at 2 to the hinge post 3 of a fence 4, said gate being preferably but not necessarily formed of a Z-bar 5 and wires 6 as shown.

A cross bar 7 passes through the end bar at the hinged end of the gate and is located above the uppermost hinge 2, said bar 7 extending in opposite directions from the gate and having eyes 8 at its ends which receive therein a pair of links 9. A pair of wires or the like 10 lead from the front ends of the links 9 to the unhinged end of the gate 1, whereas a pair of chains or other flexible connectors 11 lead from the free ends of said links to a coil spring 12 which is anchored to one of the fence posts 13.

By the arrangement of parts shown and described, the spring 12 will be placed under tension when the gate is swung in one direction or the other, and thus will serve to again close said gate when it is released. Furthermore, the spring in question serves, through the instrumentality of the parts 9, 10 and 11, to support the free end of the gate against sagging and to thus relieve the hinges of excessive strain.

From the foregoing, taken in connection with the accompanying drawing, it will be obvious that although the invention is of comparatively simple and inexpensive construction, it will be highly efficient and durable. Since probably the best results are obtained from the specific details shown and described, such details are preferably employed, but I wish to be understood that within the scope of the invention as claimed, numerous minor changes may well be made.

I claim:

1. A gate having at its hinged end a pair of transverse oppositely extending arms, a single spring anchored to the fence at a point spaced longitudinally of the fence from said hinged end of the gate, and a pair of flexible connectors leading from said spring to the outer ends of said arms.

2. A gate having at its hinged end a pair of transverse oppositely extending arms disposed above its hinges, a pair of truss devices extending from the ends of said arms to the free end of the gate, a pair of flexible connectors leading from the ends of said arms in the opposite direction from said truss devices, and spring means secured to the fence and to said connectors.

In testimony whereof I have hereunto set my hand in the presence of two subscribing witnesses.

HARRY E. DURST.

Witnesses:
FRANK T. KELSEY,
LULA B. KELSEY.